(12) United States Patent
Meloney et al.

(10) Patent No.: US 9,275,638 B2
(45) Date of Patent: Mar. 1, 2016

(54) METHOD AND APPARATUS FOR TRAINING A VOICE RECOGNITION MODEL DATABASE

(71) Applicant: Google Technology Holdings LLC, Mountain View, CA (US)

(72) Inventors: John R Meloney, Lake Barrington, IL (US); Joel A Clark, Woodridge, IL (US); Joseph C Dwyer, Downers Grove, IL (US); Adrian M Schuster, West Olive, MI (US); Snehitha Singaraju, Gurnee, IL (US); Robert A Zurek, Antioch, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 136 days.

(21) Appl. No.: 14/094,875

(22) Filed: Dec. 3, 2013

(65) Prior Publication Data

US 2014/0278420 A1    Sep. 18, 2014

Related U.S. Application Data

(60) Provisional application No. 61/776,793, filed on Mar. 12, 2013, provisional application No. 61/798,097, filed on Mar. 15, 2013, provisional application No. 61/819,985, filed on May 6, 2013.

(51) Int. Cl.
*G10L 15/00* (2013.01)
*G10L 15/06* (2013.01)
*G10L 15/20* (2006.01)

(52) U.S. Cl.
CPC ............... *G10L 15/063* (2013.01); *G10L 15/20* (2013.01)

(58) Field of Classification Search
CPC ....... G10L 15/20; G10L 15/01; G10L 19/012; G10L 21/0208; G10L 25/78; H04M 3/42348; H04M 9/082; H04M 3/18
USPC .............. 704/249, 256.4, 244, 233, 231, 229, 704/226; 381/86; 379/406.01
See application file for complete search history.

(56) References Cited

U.S. PATENT DOCUMENTS 4,348,550 A    9/1982  Pirz et al.
4,363,102 A    12/1982  Holmgren et al.

(Continued)

FOREIGN PATENT DOCUMENTS

EP    1199708        4/2002
EP    1262953 B1    12/2005

OTHER PUBLICATIONS

Office Action issued in U.S. Appl. No. 11/767,853 on Aug. 14, 2012, 8 pages.

(Continued)

*Primary Examiner* — Michael Colucci
(74) *Attorney, Agent, or Firm* — Fish & Richardson P.C.

(57) ABSTRACT

An electronic device digitally combines a single voice input with each of a series of noise samples. Each noise sample is taken from a different audio environment (e.g., street noise, babble, interior car noise). The voice input/noise sample combinations are used to train a voice recognition model database without the user having to repeat the voice input in each of the different environments. In one variation, the electronic device transmits the user's voice input to a server that maintains and trains the voice recognition model database.

20 Claims, 6 Drawing Sheets

(56) References Cited

U.S. PATENT DOCUMENTS

| | | |
|---|---|---|
| 4,656,651 A | 4/1987 | Evans et al. |
| 4,763,350 A | 8/1988 | Immendorfer et al. |
| 4,785,408 A | 11/1988 | Britton et al. |
| 4,805,212 A | 2/1989 | Hase et al. |
| 4,827,500 A | 5/1989 | Binkerdeet et al. |
| 4,827,518 A | 5/1989 | Feustel et al. |
| 4,837,804 A | 6/1989 | Akita |
| 4,876,717 A | 10/1989 | Barron et al. |
| 4,914,692 A | 4/1990 | Hartwell et al. |
| 4,979,206 A | 12/1990 | Padden et al. |
| 5,033,088 A | 7/1991 | Shipman |
| 5,125,024 A | 6/1992 | Gokeen et al. |
| 5,127,043 A | 6/1992 | Hunt et al. |
| 5,136,631 A | 8/1992 | Einhorn et al. |
| 5,165,095 A | 11/1992 | Borcherding |
| 5,181,237 A | 1/1993 | Dowden et al. |
| 5,193,110 A | 3/1993 | Jones et al. |
| 5,199,062 A | 3/1993 | Von Meister et al. |
| 5,204,894 A | 4/1993 | Darden |
| 5,208,848 A | 5/1993 | Pula |
| 5,274,695 A | 12/1993 | Green |
| 5,297,183 A | 3/1994 | Bareis et al. |
| 5,297,194 A | 3/1994 | Hunt et al. |
| 5,301,227 A | 4/1994 | Kamei et al. |
| 5,353,336 A | 10/1994 | Hou et al. |
| 5,369,685 A | 11/1994 | Kero |
| 5,452,340 A | 9/1995 | Engelbeck et al. |
| 5,479,489 A | 12/1995 | O'Brien |
| 5,479,491 A | 12/1995 | Herrero-Garcia et al. |
| 5,517,566 A | 5/1996 | Smith et al. |
| 5,652,789 A | 7/1997 | Miner et al. |
| 5,657,422 A * | 8/1997 | Janiszewski .......... G10L 19/012 704/229 |
| 5,717,738 A | 2/1998 | Gammel |
| 5,719,921 A | 2/1998 | Vysotsky et al. |
| 5,799,273 A | 8/1998 | Mitchell et al. |
| 5,805,672 A | 9/1998 | Barkat et al. |
| 5,832,063 A | 11/1998 | Vysotsky et al. |
| 5,893,059 A | 4/1999 | Raman |
| 5,912,949 A | 6/1999 | Chan et al. |
| 5,915,001 A | 6/1999 | Uppaluru |
| 5,953,700 A | 9/1999 | Kanesky et al. |
| 5,956,683 A | 9/1999 | Jacobs et al. |
| 5,960,399 A | 9/1999 | Barclay et al. |
| 5,970,446 A | 10/1999 | Goldberg et al. |
| 5,995,826 A | 11/1999 | Cox et al. |
| 6,016,336 A | 1/2000 | Hanson |
| 6,021,181 A | 2/2000 | Miner et al. |
| 6,094,476 A | 7/2000 | Hunt et al. |
| 6,118,866 A | 9/2000 | Shtivelman |
| 6,144,667 A | 11/2000 | Doshi et al. |
| 6,144,938 A | 11/2000 | Surace et al. |
| 6,157,705 A | 12/2000 | Perrone |
| 6,163,608 A * | 12/2000 | Romesburg ............ H04M 9/082 379/406.01 |
| 6,167,117 A | 12/2000 | Will |
| 6,167,118 A | 12/2000 | Slivensky |
| 6,185,535 B1 | 2/2001 | Hedin et al. |
| 6,212,408 B1 | 4/2001 | Son et al. |
| 6,259,772 B1 | 7/2001 | Stephens et al. |
| 6,259,786 B1 | 7/2001 | Gisby |
| 6,260,012 B1 | 7/2001 | Park |
| 6,282,511 B1 | 8/2001 | Mayer |
| 6,323,306 B1 | 11/2001 | Song et al. |
| 6,327,343 B1 | 12/2001 | Epstein et al. |
| 6,347,085 B2 | 2/2002 | Kelly |
| 6,363,348 B1 | 3/2002 | Besling et al. |
| 6,363,349 B1 | 3/2002 | Urs et al. |
| 6,366,886 B1 | 4/2002 | Dragosh et al. |
| 6,389,393 B1 * | 5/2002 | Gong ..................... G10L 15/065 704/244 |
| 6,400,806 B1 | 6/2002 | Uppaluru |
| 6,404,876 B1 | 6/2002 | Smith et al. |
| 6,408,272 B1 | 6/2002 | White et al. |
| 6,418,411 B1 | 7/2002 | Gong |
| 6,442,519 B1 | 8/2002 | Kanevsky et al. |
| 6,449,496 B1 | 9/2002 | Beith et al. |
| 6,453,020 B1 | 9/2002 | Hughes et al. |
| 6,456,699 B1 | 9/2002 | Burg et al. |
| 6,463,413 B1 | 10/2002 | Applebaum et al. |
| 6,487,534 B1 | 11/2002 | Thelen et al. |
| 6,493,433 B2 | 12/2002 | Clabaugh et al. |
| 6,493,673 B1 | 12/2002 | Ladd et al. |
| 6,501,832 B1 | 12/2002 | Saylor et al. |
| 6,507,643 B1 | 1/2003 | Groner |
| 6,574,599 B1 | 6/2003 | Lim et al. |
| 6,633,846 B1 | 10/2003 | Bennett et al. |
| 6,650,738 B1 | 11/2003 | Pershan et al. |
| 6,690,772 B1 | 2/2004 | Naik et al. |
| 6,693,893 B1 | 2/2004 | Ehlinger |
| 6,744,860 B1 | 6/2004 | Schrage |
| 6,744,861 B1 | 6/2004 | Pershan et al. |
| 6,792,083 B2 | 9/2004 | Dams et al. |
| 6,823,306 B2 | 11/2004 | Reding et al. |
| 6,915,262 B2 | 7/2005 | Reding et al. |
| 6,941,264 B2 | 9/2005 | Konopka et al. |
| 6,959,276 B2 * | 10/2005 | Droppo ................... G10L 15/20 379/406.01 |
| 7,725,315 B2 * | 5/2010 | Hetherington ...... G10L 21/0208 704/233 |
| 7,949,522 B2 * | 5/2011 | Hetherington ...... G10L 21/0208 704/226 |
| 8,027,833 B2 * | 9/2011 | Hetherington ...... G10L 21/0208 704/226 |
| 8,504,362 B2 * | 8/2013 | Lee .......................... G10L 15/20 704/216 |
| 2002/0059066 A1 | 5/2002 | O'Hagan |
| 2002/0065657 A1 | 5/2002 | Reding et al. |
| 2005/0071159 A1 * | 3/2005 | Boman ................ G10L 21/0208 704/233 |
| 2005/0119883 A1 * | 6/2005 | Miyazaki ............... G10L 15/142 704/231 |
| 2006/0053014 A1 * | 3/2006 | Yoshizawa .............. G10L 15/06 704/256.4 |
| 2006/0253283 A1 * | 11/2006 | Jabloun ................... G10L 25/78 704/233 |
| 2008/0300871 A1 * | 12/2008 | Gilbert .................... G10L 15/20 704/233 |
| 2009/0187402 A1 * | 7/2009 | Scholl ..................... G10L 15/01 704/233 |
| 2009/0271188 A1 * | 10/2009 | Agapi ................. G10L 21/0208 704/233 |
| 2010/0204988 A1 * | 8/2010 | Xu .......................... G10L 15/20 704/233 |
| 2011/0208518 A1 * | 8/2011 | Holtel ..................... H04M 3/18 704/226 |
| 2014/0064514 A1 * | 3/2014 | Mikami ............... G10L 21/0208 381/86 |

OTHER PUBLICATIONS

Office Action issued in U.S. Appl. No. 11/767,853 on Feb. 28, 2011, 25 pages.
Notice of Allowance issued in U.S. Appl. No. 09/309,274 on Apr. 6, 2007, 6 pages.
Office Action issued in U.S. Appl. No. 09/309,274 on Nov. 29, 2006, 16 pages.
Office Action issued in U.S. Appl. No. 09/309,274 on May 10, 2006, 17 pages.
Office Action issued in U.S. Appl. No. 09/309,274 on Jun. 21, 2004, 15 pages.
Office Action issued in U.S. Appl. No. 09/309,274 on Oct. 22, 2003, 17 pages.
Office Action issued in U.S. Appl. No. 09/309,274 on Mar. 11, 2003, 17 pages.
Office Action issued in U.S. Appl. No. 09/309,274 on Oct. 3, 2002, 17 pages.
Notice of Allowance issued in U.S. Appl. No. 11/767,853 on Oct. 10, 2012, 6 pages.
Office Action issued in U.S. Appl. No. 13/611,989 on May 2, 2013, 19 pages.
Notice of Allowance issued in U.S. Appl. No. 13/611,989 on Jun. 24, 2013, 6 pages.

(56) References Cited

OTHER PUBLICATIONS

Office Action issued in U.S. Appl. No. 13/932,411 on Sep. 27, 2013, 16 pages.
Office Action issued in U.S. Appl. No. 13/932,411 on Jan. 6, 2014, 5 pages.
Office Action issued in U.S. Appl. No. 13/932,411 on Jun. 30, 2014, 6 pages.
Office Action issued in U.S. Appl. No. 09/726,972 on Apr. 9, 2003, 21 pages.
Office Action issued in U.S. Appl. No. 09/726,972 on Dec. 19, 2003, 13 pages.
Office Action issued in U.S. Appl. No. 10/961,781 on Nov. 28, 2006, 16 pages.
Office Action issued in U.S. Appl. No. 10/961,781 on Jul. 23, 2007, 16 pages.
Office Action issued in U.S. Appl. No. 13/340,954 on Feb. 28, 2012, 18 pages.
Office Action issued in U.S. Appl. No. 13/340,954 on Jul. 3, 2012, 12 pages.
Office Action issued in U.S. Appl. No. 13/614,982 on Dec. 21, 2012, 19 pages.
Notice of Allowance issued in U.S. Appl. No. 13/340,954 on Jan. 28, 2013, 9 pages.
Notice of Allowance issued in U.S. Appl. No. 13/614,982 on Apr. 26, 2013, 9 pages.
Office Action issued in U.S. Appl. No. 13/922,602 on Oct. 24, 2013, 22 pages.
Office Action issued in U.S. Appl. No. 13/922,602 on Apr. 4, 2014, 16 pages.
Notice of Allowance issued in U.S. Appl. No. 13/922,602 on Jun. 18, 2014, 10 pages.
Ming et al., "Robust Speaker Recognition in Noisy Conditions," IEEE Transactions on Audio, Speech and Language Processing, IEEE Service Center, New York, NY, USA, vol. 15, No. 5, Jul. 1, 2007, pp. 1711-1723.
Ding et al., "Robust mandarin speech recognition in car environments for embedded navigation system," IEEE Transactions on Consumer Electronics, IEEE Service Center, New York, NY, US, vol. 54, No. 2, May 1, 2008, pp. 584-590.
Sasou et al., "Noise Robust Speech Recognition Applied to Voice-Driven Wheelchair," EURASIP Journal on Advances in Signal Processing, vol. 20, No. 3, Jan. 1, 2009, pp. 1-9.
International Search Report and Written Opinion in International Application No. PCT/US2014/035117, mailed Nov. 12, 2014, 13 pages.
International Preliminary Report on Patentability in International Application No. PCT/US2014/035117, mailed Nov. 19, 2015, 8 pages.

* cited by examiner

METHOD AND APPARATUS FOR TRAINING A VOICE RECOGNITION MODEL DATABASE

CROSS-REFERENCES TO RELATED APPLICATIONS

The present claims the benefit of the filing date of U.S. Provisional Patent Application 61/776,793, filed Mar. 12, 2013, the entire contents of which are incorporated by reference; U.S. Provisional Patent Application 61/798,097, filed Mar. 15, 2013, the entire contents of which are incorporated by reference; and U.S. Provisional Patent Application 61/819,985, filed May 6, 2013, the entire contents of which are incorporated by reference.

TECHNICAL FIELD

The present disclosure relates to speech recognition and, more particularly, to methods and devices for training voice recognition databases.

BACKGROUND

Although speech recognition has been around for decades, the quality of speech recognition software and hardware has only recently reached a high enough level to appeal to a large number of consumers. One area in which speech recognition has become very popular in recent years is the smartphone and tablet computer industry. Using a speech recognition-enabled device, a consumer can perform such tasks as making phone calls, writing emails, and navigating with GPS using only voice commands.

Speech recognition in such devices is far from perfect, however. A speech recognition engine typically relies on a phoneme or command database to be able to recognize voice utterances. A user may, however, need to "train" the phoneme or command database to recognize his or her speech characteristics—accent, frequently mispronounced words and syllables, tonal characteristics, cadence, etc. Even after training, however, the phoneme or command database may not be accurate in all audio environments. For example, the presence of background noise can decrease speech recognition accuracy.

DRAWINGS

While the appended claims set forth the features of the present techniques with particularity, these techniques may be best understood from the following detailed description taken in conjunction with the accompanying drawings of which:

DESCRIPTION

Figure 1:
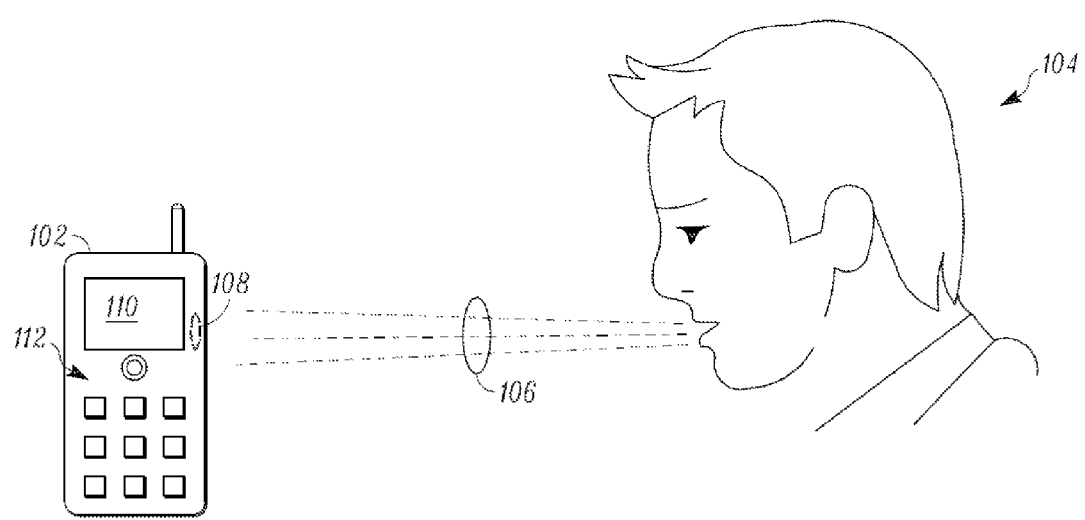
FIG. 1 shows a user speaking to an electronic device, which is depicted as a mobile device in the drawing.

The present disclosure sets forth methods and an apparatus for training noise-based voice recognition model databases. The term "noise-based voice recognition model database" (abbreviated as "VR model database") as used herein refers to a database that functions as a noise-based phoneme database, as a command database, or as both.

Various embodiments of the disclosure include manual and automated methods of training VR model databases. The manual embodiments of this disclosure include a directed training methodology in which the electronic device (also referred to as "device") directs the user to perform operations, in response to which the device updates the VR model database. The device may carry out a manual training method during the initial setup of the device, or at any time when the procedure is launched by the user. For example, when the user is in a new type of noise environment, the user may launch the manual method to train the VR model database for that type of noise, and the device may store the new noise in a noise database.

The automated embodiments include methods launched by the device without the user's knowledge. The device may launch an automated method based on environmental characteristics, such as when it senses a new type of noise or in response to the user's actions. Examples of user actions that could launch an automated training method include the user launching a speech recognition session via a button press, gesture trigger, or voice trigger. In these cases, the device would use the user's speech as well as other noises it detects to further train the VR model database. The device could also use the user's speech and detected noise for the speech recognition process itself. In such a case, if the device reacts positively to the speech recognition result (i.e., carries out the action initiated by the speech recognition process as opposed to cancelling the action), the device would launch the automated training process using both the user's utterance from the speech recognition event and the result of that event as the training target.

According to various embodiments, the device trains the VR model database using previously-recorded noises and previously-recorded utterances (retrieved from a noise database and an utterance database, respectively) in addition to live utterances and live noises. Like the live noises and utterances, the previously-recorded utterances can be obtained in different noise environments and during different use cases of the device. The previously-recorded utterances and noises may be stored in, and retrieved from, a noise database and an utterance database, respectively. Additionally, the device can store the live utterances and the live noises in a noise database and an utterance database, respectively, for future use.

According to an embodiment, the device can train the VR model database in various ways, any of which, depending on the circumstances, may be used for both the manual and the automated training methodologies. For example, three methodologies relate to how the composite speech and noise signal is captured for the purpose of training the VR model databases. The first of these methods is based on a composite signal of speech and natural noise captured by the device. The second is based on capturing a composite signal of live speech with noise generated by the device's acoustic output transducer. The third is based on a composite signal that the device generates by mixing speech and noise that it captures live or that it retrieves from memory. This last embodiment can use speech captured in a quiet environment mixed with previously stored noise files, or captured noise mixed with previously stored speech utterances.

In one embodiment, an electronic device digitally combines a single voice input with each of a series of noise samples. Each noise sample is taken from a different audio environment (e.g., street noise, babble, interior car noise). The voice input/noise sample combinations are used to train the VR model database without the user having to repeat the voice input in each of the different environments. In one variation, the electronic device transmits the user's voice input to a server that maintains and trains the VR model database.

According to an embodiment, the method is carried out by recording an utterance, digitally combining the recorded utterance with a previously-recorded noise sample, and training a noise-based VR model database based on this digital combination. Using the same, single utterance, these steps may be repeated for each previously-recorded noise sample of a set of noise samples (e.g., noise samples of a noise database), and may be thus repeated prior to recording a different utterance. Over time, this process can be repeated so as to continually improve speech recognition.

Alternatively, the electronic device can generate an artificial noise environment using a predefined noise playback (pink, car, babble), or no feedback (silence) using the speakers on the device. The user speaks during the playback and without the playback. This allows the device to identify changes in user's speech characteristics in quiet vs. noisy audio environments. The VR model database can be trained based on this information.

One embodiment involves receiving an utterance via a microphone of an electronic device and, while receiving the utterance, reproducing a previously-recorded noise sample through a speaker of the electronic device. The microphone picks up both the utterance and the previously-recorded noise.

Yet another embodiment involves recording an utterance during a speech to text command ("STT") mode, and determining whether the recorded utterance is an STT command. Such a determination may be made based on whether a word-recognition confidence value exceeds a threshold.

If the recorded utterance is identified as an STT command, the electronic device performs a function based on the STT command. If the electronic device performs the correct function (i.e., the function associated with the command), then the device trains the noise-based VR model database to associate the utterance with the command.

This method may also be repeatedly performed during the STT command mode for the same speech phrase recorded from the same person combined with different noise environments. Examples of noise environments include a home, a car, a street, an office, and a restaurant.

When the current disclosure refers to modules and other elements "providing" information (data) to one another, it is to be understood that there are a variety of possible ways such action may be carried out, including electrical signals being transmitted along conductive paths (e.g., wires) and inter-object method calls.

The embodiments described herein are usable in the context of always-on audio (AOA). When using AOA, an electronic device is capable of waking up from a sleep mode upon receiving a trigger command from a user. AOA places additional demands on devices, especially mobile devices. AOA is most effective when the electronic device is able to recognize the user's voice commands accurately and quickly Referring to FIG. 1, a user 104 provides voice input (or vocalized information or speech) 106 that is received by a speech recognition-enabled electronic device ("device") 102 by way of a microphone (or other sound receiver) 108. The device 102, which is a mobile device in this example, includes a touch screen display 110 that is able to display visual images and to receive or sense touch type inputs as provided by way of a user's finger or other touch input device such as a stylus. Notwithstanding the presence of the touch screen display 110, in the embodiment shown in FIG. 1, the device 102 also has a number of discrete keys or buttons 112 that serve as input devices of the device. However, in other embodiments such keys or buttons (or any particular number of such keys or buttons) need not be present, and the touch screen display 110 can serve as the primary or only user input device.

Although FIG. 1 particularly shows the device 102 as including the touch screen display 110 and keys or buttons 112, these features are only intended to be examples of components/features on the device 102, and in other embodiments the device 102 need not include one or more of these features and/or can include other features in addition to or instead of these features.

The device 102 is intended to be representative of a variety of devices including, for example, cellular telephones, personal digital assistants (PDAs), smart phones, or other handheld or portable electronic devices. In alternate embodiments, the device can also be a headset (e.g., a Bluetooth headset), MP3 player, battery-powered device, a watch device (e.g., a wristwatch) or other wearable device, radio, navigation device, laptop or notebook computer, netbook, pager, PMP (personal media player), DVR (digital video recorders), gaming device, camera, e-reader, e-book, tablet device, navigation device with video capable screen, multimedia docking station, or other device.

Embodiments of the present disclosure are intended to be applicable to any of a variety of electronic devices that are capable of or configured to receive voice input or other sound inputs that are indicative or representative of vocalized information.

Figure 2:
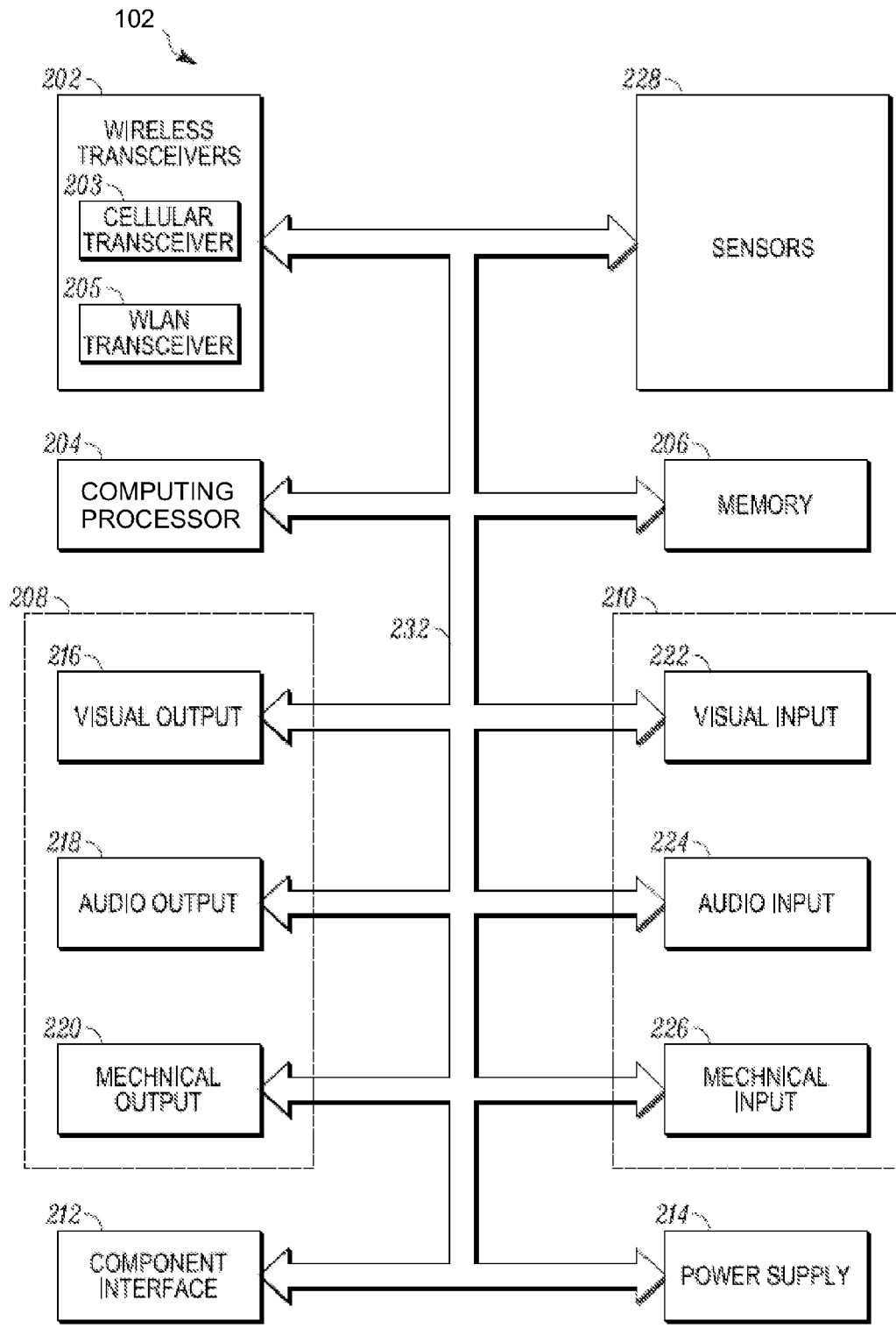
FIG. 2 shows example components of the electronic device of FIG. 1.

FIG. 2 shows internal components of the device 102 of FIG. 1, in accordance with an embodiment of the disclosure. As shown in FIG. 2, the device 102 includes one or more wireless transceivers 202, a computing processor 204 (e.g., a microprocessor, microcomputer, application-specific integrated circuit, digital signal processor, etc.), a memory 206, one or more output devices 208, and one or more input devices 210. The device 102 can further include a component interface 212 to provide a direct connection to auxiliary components or accessories for additional or enhanced functionality. The device 102 may also include a power supply 214, such as a battery, for providing power to the other internal components while enabling the mobile device to be portable. Further, the device 102 additionally includes one or more sensors 228. All of the components of the device 102 can be coupled to one another and be in communication with one another, by way of one or more internal communication links 232 (e.g., an internal bus).

Further, in the embodiment of FIG. 2, the wireless transceivers 202 particularly include a cellular transceiver 203 and a wireless local area network (WLAN) transceiver 205. More particularly, the cellular transceiver 203 is configured to conduct cellular communications, such as 3G, 4G, 4G-LTE, vis-à-vis cell towers (not shown), albeit in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the WLAN transceiver 205 is configured to conduct communications in accordance with the IEEE 802.11(a, b, g, or n) standard with access points. In other embodiments, the WLAN transceiver 205 can instead (or in addition) conduct other types of communications commonly understood as being encompassed within WLAN communications such as some types of peer-to-peer (e.g., Wi-Fi Peerto-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the present embodiment, the device 102 has two of the wireless transceivers 202 (that is, the transceivers 203 and 205), the present disclosure is intended to encompass numerous embodiments in which any arbitrary number of wireless transceivers employing any arbitrary number of communication technologies are present. By virtue of the use of the wireless transceivers 202, the device 102 is capable of communicating with any of a variety of other devices or systems (not shown) including, for example, other mobile devices, web servers, cell towers, access points, other remote devices, etc. Depending upon the embodiment or circumstance, wireless communication between the device 102 and any arbitrary number of other devices or systems can be achieved.

Operation of the wireless transceivers 202 in conjunction with other internal components of the device 102 can take a variety of forms. For example, operation of the wireless transceivers 202 can proceed in a manner in which, upon reception of wireless signals, the internal components of the device 102 detect communication signals and the transceivers 202 demodulate the communication signals to recover incoming information, such as voice and/or data, transmitted by the wireless signals. After receiving the incoming information from the transceivers 202, the computing processor 204 formats the incoming information for the one or more output devices 208. Likewise, for transmission of wireless signals, the computing processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208 and 210 of the device 102 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as the microphone 108 of FIG. 1 (or further for example a microphone of a Bluetooth headset), and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the device 102 also can include one or more of various types of sensors 228 as well as a sensor hub to manage one or more functions of the sensors. The sensors 228 may include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the device 102. Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). In particular, in the present embodiment in which the device 102 includes the touch screen display 110, the touch screen display can be considered to constitute both a visual output device and a mechanical input device (by contrast, the keys or buttons 112 are merely mechanical input devices).

The memory 206 can encompass one or more memory devices of any of a variety of forms (e.g., read-only memory, random access memory, static random access memory, dynamic random access memory, etc.), and can be used by the computing processor 204 to store and retrieve data. In some embodiments, the memory 206 can be integrated with the computing processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory 206 of the device 102 can be supplemented or replaced by other memory(s) located elsewhere apart from the device 102 and, in such embodiments, the device 102 can be in communication with or access such other memory device(s) by way of any of various communications techniques, for example, wireless communications afforded by the wireless transceivers 202, or connections via the component interface 212.

The data that is stored by the memory 206 can include, but need not be limited to, operating systems, programs (applications), modules, and informational data. Each operating system includes executable code that controls basic functions of the device 102, such as interaction among the various components included among the internal components of the device 102, communication with external devices via the wireless transceivers 202 and/or the component interface 212, and storage and retrieval of programs and data, to and from the memory 206. As for programs, each program includes executable code that utilizes an operating system to provide more specific functionality, such as file system service and handling of protected and unprotected data stored in the memory 206. Such programs can include, among other things, programming for enabling the device 102 to perform a process such as the process for speech recognition shown in FIG. 3 and discussed further below. Finally, with respect to informational data, this is non-executable code or information that can be referenced and/or manipulated by an operating system or program for performing functions of the device 102.

Figure 3:
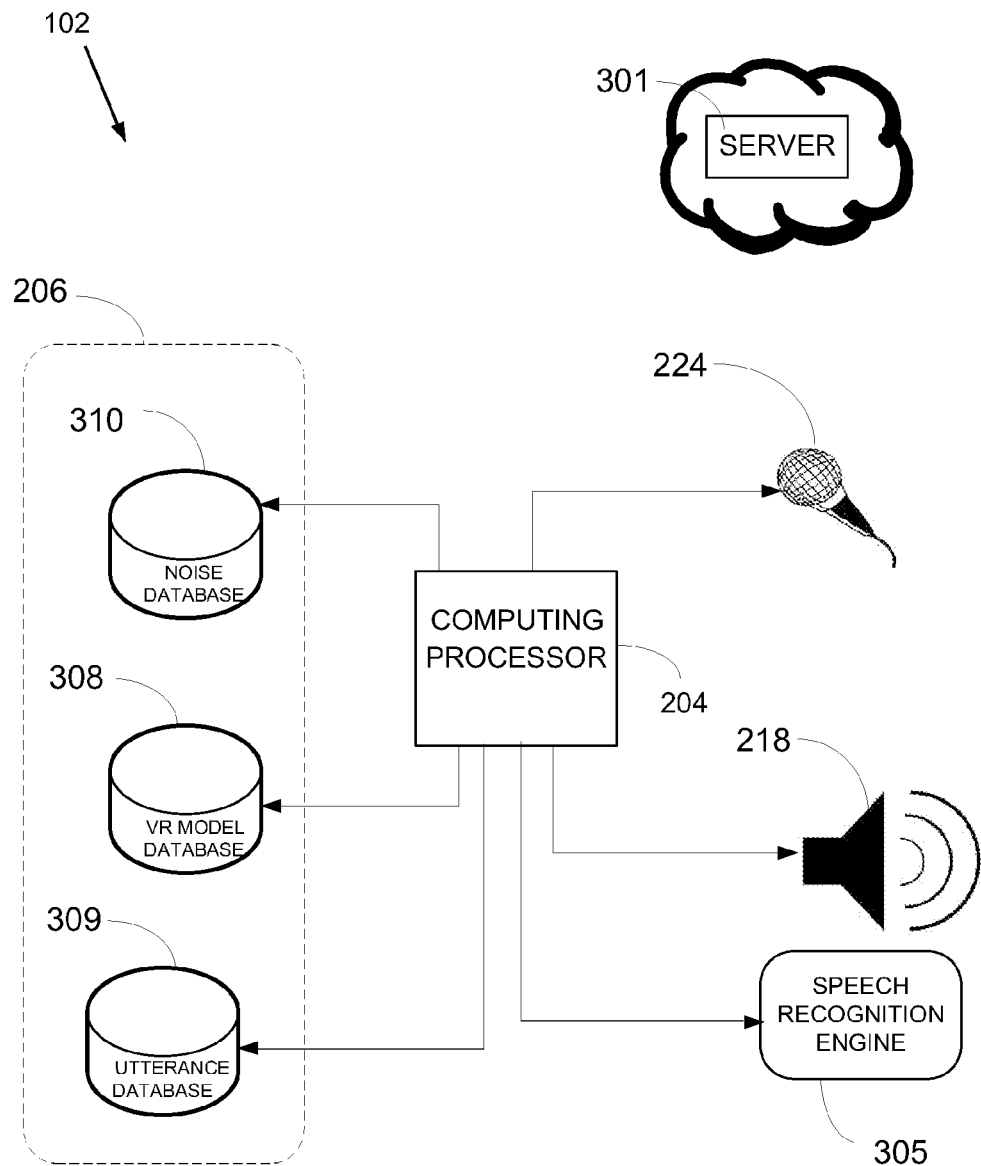
FIG. 3 shows an architecture on which various embodiments may be implemented.

Referring to FIG. 3, a configuration for the electronic device 102 according to an embodiment will now be described. Stored in the memory 206 of the electronic device 102 are a VR model database 308, an utterance database 309, and a noise database 310, all of which are accessible to the computing processor 204, the audio input device 224 (e.g., microphones), and the audio output device 218 (e.g., a speaker). The VR model database 308 contains data that associates sounds with speech phonemes or commands or both. The utterance database 309 contains samples of user speech utterances that are recorded of or by the user. The noise database 310 contains samples of noise that are recorded from different environments, digitally generated or both.

The device 102 is capable of accessing a network such as the Internet. While the figure shows direct coupling of components such as audio input device 224, audio output device 218, etc., the connection to the computing processor 204 may be through other components or circuitry in the device. Additionally, utterances and noise that the device 102 captures may be temporarily stored in the memory 206, or more persistently in the utterance database 309 and noise database 310, respectively. Whether stored temporarily or not, the utterances and noises can be subsequently accessed by the computing processor 204. The computing processor 204 may reside external to the electronic device 102, such as on a server on the internet.

The computing processor 204 executes a speech recognition engine 305, which may be resident in the memory 206, and which has access to the noise database 310, the utterance database 309, and the VR model database 308. In one embodiment, one or more of the noise database 310, the utterance database 309, the VR model database 308, and the speech recognition engine 305 are stored and executed by a remotely located server 301.

Figure 4:
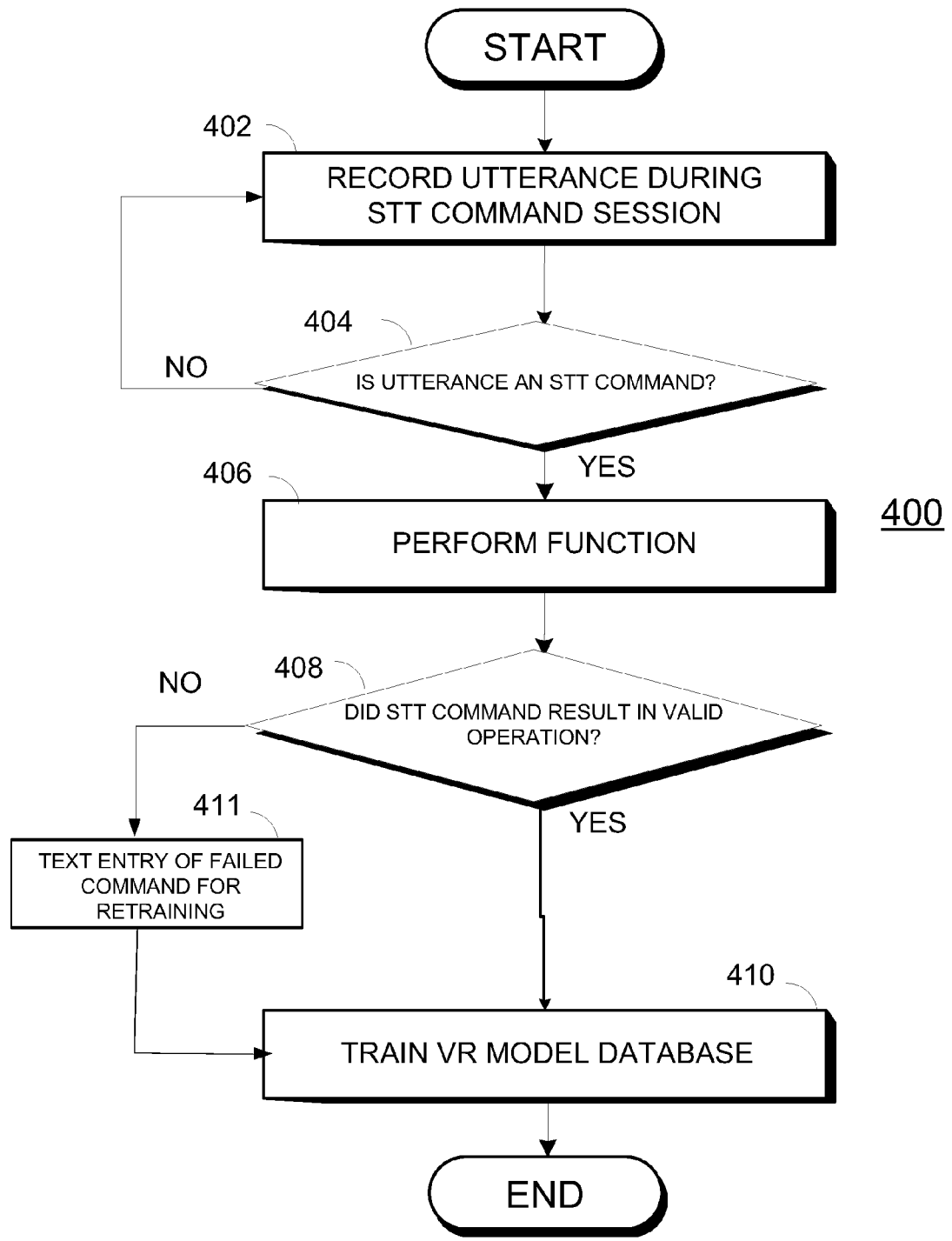
FIGS. 4-6 show steps that may be carried out according to embodiments of the disclosure.

Referring to FIG. 4, a procedure carried out by the electronic device 102 (FIG. 3) according to an embodiment will now be described. The procedure 400 shown in FIG. 4 is a passive training system that updates and improves VR model database 308 in a way that is transparent to the user since it does not require the user's cognizant interaction to augment the model. The procedure 400 starts with the electronic device 102 being in an STT command session, during which the speech recognition engine 305 is in a mode in which it interprets utterances as commands rather than as words that are to be converted into text.

At step 402, the electronic device 102 records an utterance of the user's speech including the natural background noise. The recorded utterance and noise may be stored in the utterance database 309 and noise database 310 for future use. At step 404, the speech recognition engine determines whether the utterance is an STT command. In doing so, the speech recognition engine 305 determines the most likely candidate STT command given the utterance. The speech recognition engine 305 assigns a confidence score to that candidate and, if the confidence score is above a predetermined threshold, deems the utterance to be an STT command. Among the factors influencing the confidence score is the methodology used in performing the training. If the utterance is determined not to be an STT command, then the process returns to step 402. If it is determined to be an STT command, the electronic device 102 performs a function based on the STT command at step 406.

At step 408, the electronic device 102 determines whether the function performed is a valid operation. If so, then at step 410, the electronic device 102 trains the VR model database 308 by, for example, associating the user's utterances with the command. This process executed during normal operation allows the electronic device 102 to update the original VR model database 308 to reflect actual usage in multiple environments which naturally include the noise inherent in those environments. The device 102 may also use previously-recorded utterances from the utterance database 309 and previously-recorded noise from the noise database 310 during this training process.

In an alternative embodiment, a "No" response during step 408 will result in the device 102 asking the user to enter the text for the command they wish to execute in step 411. This text and the utterance captured in step 402 will then be used to train and update the VR model database 308.

Figure 5:
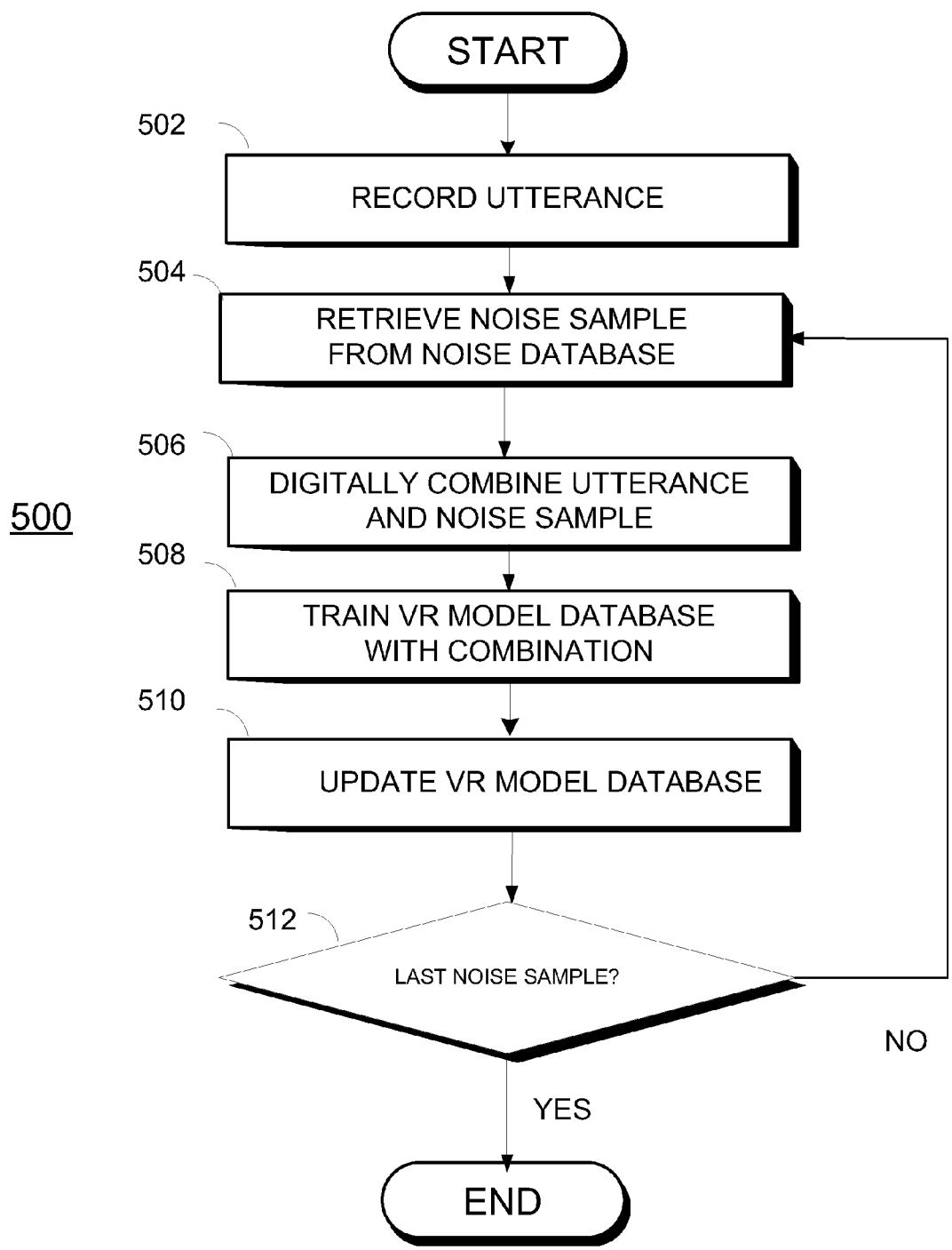

Referring to FIG. 5, another procedure carried out by the electronic device 102 according to an embodiment will now be described. The procedure 500 is a procedure in which the user knowingly interacts with the electronic device 102. The procedure 500 begins at step 502, at which the electronic device 102 records an utterance, e.g., by converting it into digital data and storing it as a digital file. This storage location can be volatile memory or in more persistent memory (e.g., in the utterance database 309). At step 504, the electronic device 102 retrieves data of a noise sample from the noise database 310 (e.g., restaurant noise). The electronic device 102 may select the noise sample (e.g. cycle through some or all of the previously-recorded noise samples) or the user may select the noise sample. At step 506, the electronic device 102 digitally combines the noise sample and the utterance. At step 508, the electronic device 102 trains the VR model database 308 using the combined noise sample and utterance. At step 510, the electronic device 102 updates the VR model database 308. At step 512, the electronic device 102 determines whether there are any more noises with which to train the VR model database 308. If there are none, then the process ends. If there are, then the process loops back to step 504, at which the electronic device 102 retrieves another noise sample from the noise database 310.

Figure 6:
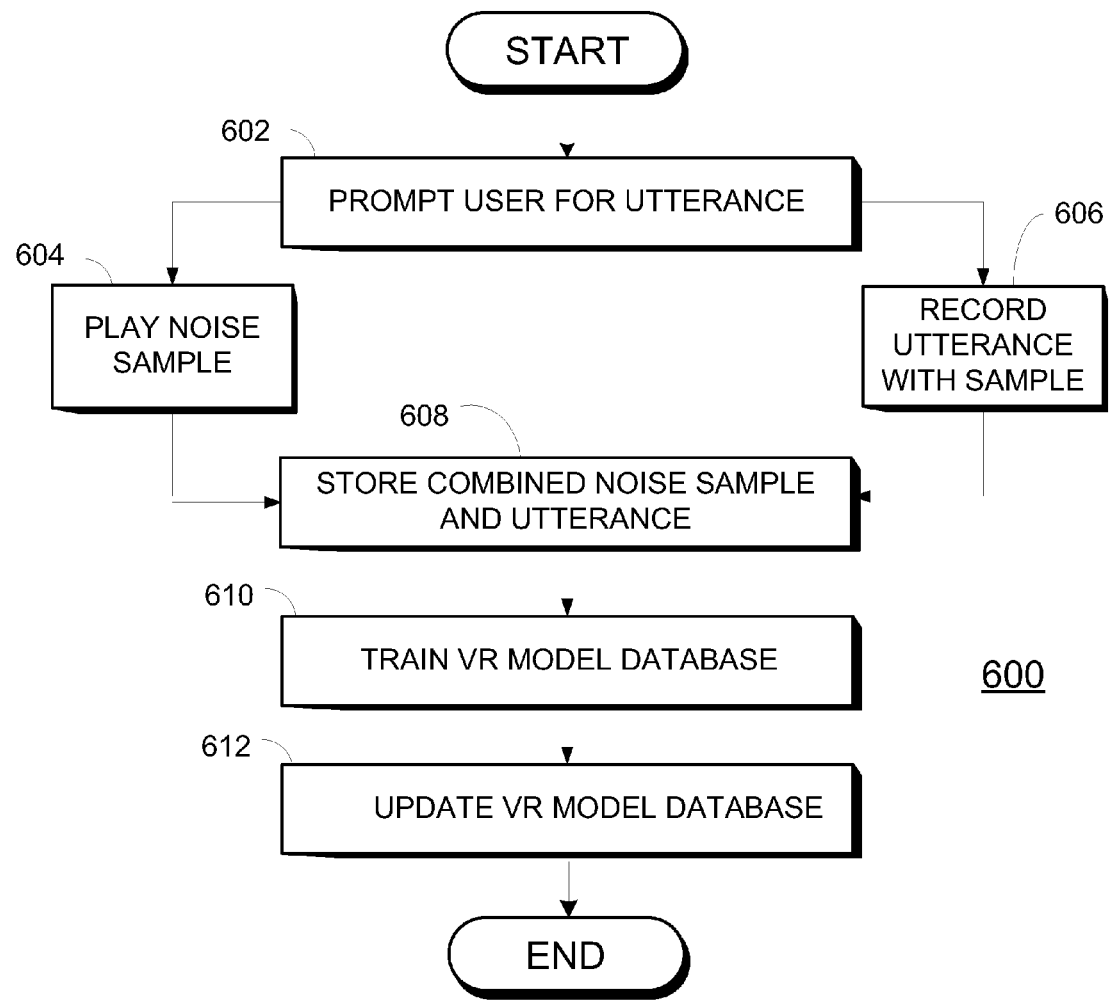

Referring to FIG. 6, still another procedure carried out by the electronic device 102 according to an embodiment will now be described. The procedure 600 begins at step 602, at which the electronic device 102 prompts a user for an utterance. At step 604, the electronic device 102 plays a noise sample of the noise database 310 via the speaker 306.

The electronic device carries out step 606 at the same time it carries out step 604. At step 606, the electronic device 102 records the user's utterance along with the played noise sample. At step 608, the electronic device 102 stores the acoustically combined noise sample and utterance in volatile memory or in the noise database 310 and the utterance database 309. At step 610, the electronic device 102 trains the VR model database 308 using the combined noise sample and utterance. At step 612, the electronic device 102 updates the VR model database 308.

It can be seen from the foregoing that a method for apparatus for training a voice recognition database has been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:
1. A computer-implemented method comprising:
  receiving speech data corresponding to an utterance spoken in a particular noise environment;
  for each of a plurality of noise environments that are different than the particular noise environment:

combining the speech data with stored noise data that is associated with the noise environment of the plurality of noise environments, to generate noise-specific, training audio data, and training a noise-specific, speech recognition model based at least on the noise-specific, training audio data; and providing the respective, noise-specific, speech recognition models associated with each of the plurality of noise environments, for output.

2. The method of claim 1, comprising:

receiving, from a user, data indicating a selection of the stored noise data, wherein the speech data is received from the user.

3. The method of claim 1, wherein the plurality of noise environments comprises:

noise associated with a home,
noise associated with a car,
noise associated with an office, or
noise associated with a restaurant.

4. The method of claim 1, comprising:

detecting a new noise type; and
storing new noise data that is associated with the new noise type.

5. The method of claim 1, comprising:

detecting a new noise type; and
in response to detecting the new noise type:
prompting a user to provide additional speech data; and
training a noise-specific, speech recognition model based at least on the additional speech data.

6. The method of claim 1, comprising:

receiving additional speech data;
combining the additional speech data with the stored noise data to generate additional noise-specific, training audio data; and
updating the noise-specific, speech recognition model based on the additional noise-specific, training audio data.

7. The method of claim 1, comprising:

receiving additional speech data from a user who provided the speech data; and
after combining the speech data and training the noise-specific, speech recognition model:
combining the additional speech data with the stored noise data to generate additional noise-specific, training audio data; and
updating the noise-specific, speech recognition model based on the additional noise-specific, training audio data.

8. The method of claim 1, comprising:

storing the speech data in a speech data database.

9. A system comprising:

one or more computers and one or more storage devices storing instructions that are operable, when executed by the one or more computers, to cause the one or more computers to perform operations comprising:
receiving speech data corresponding to an utterance spoken in a particular noise environment;
for each of a plurality of noise environments that are different than the particular noise environment:
combining the speech data with stored noise data that is associated with the noise environment of the plurality of noise environments, to generate noise-specific, training audio data, and
training a noise-specific, speech recognition model based at least on the noise-specific, training audio data; and
providing the respective, noise-specific, speech recognition models associated with each of the plurality of noise environments, for output.

10. The system of claim 9, wherein the operations further comprise:

receiving, from a user, data indicating a selection of the stored noise data, wherein the speech data is received from the user.

11. The system of claim 9, wherein the plurality of noise environments comprises:

noise associated with a home,
noise associated with a car,
noise associated with an office, or
noise associated with a restaurant.

12. The system of claim 9, wherein the operations further comprise:

detecting a new noise type; and
storing new noise data that is associated with the new noise type.

13. The system of claim 9, wherein the operations further comprise:

detecting a new noise type; and
in response to detecting the new noise type:
prompting a user to provide additional speech data; and
training a noise-specific, speech recognition model based at least on the additional speech data.

14. The system of claim 9, wherein the operations further comprise:

receiving additional speech data;
combining the additional speech data with the stored noise data to generate additional noise-specific, training audio data; and
updating the noise-specific, speech recognition model based on the additional noise-specific, training audio data.

15. The system of claim 9, wherein the operations further comprise:

receiving additional speech data from a user who provided the speech data; and
after combining the speech data and training the noise-specific, speech recognition model:
combining the additional speech data with the stored noise data to generate additional noise-specific, training audio data; and
updating the noise-specific, speech recognition model based on the additional noise-specific, training audio data.

16. The system of claim 9, wherein the operations further comprise:

storing the speech data in a speech data database.

17. A non-transitory computer-readable medium storing software comprising instructions executable by one or more computers which, upon such execution, cause the one or more computers to perform operations comprising:

receiving speech data corresponding to an utterance spoken in a particular noise environment;
for each of a plurality of noise environments that are different than the particular noise environment:
combining the speech data with stored noise data that is associated with the noise environment of the plurality of noise environments, to generate noise-specific, training audio data, and
training a noise-specific, speech recognition model based at least on the noise-specific, training audio data; and providing the respective, noise-specific, speech recognition models associated with each of the plurality of noise environments, for output.

18. The medium of claim 17, wherein the operations further comprise:

receiving, from a user, data indicating a selection of the stored noise data, wherein the speech data is received from the user.

19. The medium of claim 17, wherein the plurality of noise environments comprises:

noise associated with a home,
noise associated with a car,
noise associated with an office, or
noise associated with a restaurant.

20. The medium of claim 17, wherein the operations further comprise:

detecting a new noise type; and
storing new noise data that is associated with the new noise type.

* * * * *